US008838189B2

(12) United States Patent
Andersen et al.

(10) Patent No.: US 8,838,189 B2
(45) Date of Patent: Sep. 16, 2014

(54) CUSTOMIZED AUDIO/ANTENNA MODULE AND METHOD FOR MAKING THE SAME

(75) Inventors: Morten Kjeldsen Andersen, Odder (DK); Kim Andersen, Horsens (DK); Christopher Wilk, Toronto (CA); Yasser Amin, Tilst (DK); Jørgen Mortensen, Horsens (DK)

(73) Assignee: Gettop Europe R&D APS, Herlev (DK)

( * ) Notice: Subject to any disclaimer, the term of this patent is extended or adjusted under 35 U.S.C. 154(b) by 188 days.

(21) Appl. No.: 13/499,242

(22) PCT Filed: Oct. 5, 2010

(86) PCT No.: PCT/EP2010/064829

§ 371 (c)(1), (2), (4) Date: Mar. 29, 2012

(87) PCT Pub. No.: WO2011/042436

PCT Pub. Date: Apr. 14, 2011

(65) Prior Publication Data

US 2012/0190322 A1 Jul. 26, 2012

Related U.S. Application Data

(60) Provisional application No. 61/272,536, filed on Oct. 5, 2009.

(51) Int. Cl.

| | |
|---|---|
| ***H04B 1/08*** | (2006.01) |
| ***H04R 7/18*** | (2006.01) |
| ***H01Q 1/52*** | (2006.01) |
| ***H01Q 1/44*** | (2006.01) |
| ***H04R 7/12*** | (2006.01) |
| ***H01Q 1/24*** | (2006.01) |
| ***H04R 9/02*** | (2006.01) |

(52) U.S. Cl.

CPC ............... *H04R 9/025* (2013.01); *H01Q 1/526* (2013.01); *H04R 2499/11* (2013.01); *H01Q 1/44* (2013.01); *H04R 2307/029* (2013.01); *H04R 7/127* (2013.01); *H01Q 1/243* (2013.01)

USPC ......... 455/575.1; 381/386; 455/269; 455/347

(58) Field of Classification Search

USPC .......... 455/550.1, 569.1, 575.1, 83, 269, 347; 381/386, 345

See application file for complete search history.

(56) References Cited

U.S. PATENT DOCUMENTS

2005/0276978 A1 12/2005 Chen ............................ 428/408

(Continued)

FOREIGN PATENT DOCUMENTS

EP 2 045 873 A1 4/2009 ............... H01Q 1/24
GB 2 337 397 A 11/1999 ............. H04M 1/03

(Continued)

OTHER PUBLICATIONS

Shinagawa, S. et al.: "Conductive Papers for Electromagnetic Shielding," pp. 372-375, Dec. 6, 1999 (4 pages).
PCT International Search Report for International Application No. PCT/EP2010/064829 dated Nov. 11, 2011 (4 pages).

*Primary Examiner* — Blane J Jackson
(74) *Attorney, Agent, or Firm* — Nixon Peabody LLP

(57) ABSTRACT

The present invention relates to a method for assembling a self-contained audio/antenna module for a portable communication device, the method comprising the steps of incorporating, into the audio/antenna module, one or more transducers, said incorporation comprising, for at least one transducer, the steps of custom designing and implementing a membrane structure for the at least one transducer in accordance with design constrains provided by an audio/antenna module casing, and incorporating a standard, prefabricated magnetic circuit into the audio/antenna module, said magnetic circuit being adapted to displace the membrane structure of the at least one transducer in accordance with incoming audio drive signals. The invention further relates to an audio/antenna module manufactured according to the above-mentioned method.

7 Claims, 7 Drawing Sheets

(56) References Cited

U.S. PATENT DOCUMENTS

2007/0049326 A1* 3/2007 Kim ........................... 455/550.1
2007/0242848 A1* 10/2007 Yang ............................. 381/386
2007/0275769 A1* 11/2007 Ho et al. .................... 455/569.1
2008/0144879 A1* 6/2008 Yang et al. .................... 381/386
2008/0268925 A1 10/2008 Tang .......................... 455/575.7

FOREIGN PATENT DOCUMENTS

WO WO 2007/135230 A1 11/2007 ............... H04B 1/10
WO WO 2009/013868 A1 1/2009 ............... H04R 9/00

* cited by examiner a)

b)

CUSTOMIZED AUDIO/ANTENNA MODULE AND METHOD FOR MAKING THE SAME

CROSS REFERENCE TO RELATED APPLICATIONS

This application is a U.S. national stage of International Application No. PCT/EP2010/064829, titled "Customized Audio/Antenna Module And Method For Making The Same" and filed Oct. 5, 2010, which claims priority to U.S. Provisional Patent Application Ser. No. 61/272,536, titled "Customized Audio/Antenna Module And Method For Making The Same" and filed on Oct. 5, 2009, each of which is incorporated herein in its entirety.

FIELD OF THE INVENTION

The present invention relates to a customized audio/antenna module for portable devices, such as mobile phones. The present invention further relates to a method for manufacturing such customized audio/antenna modules.

BACKGROUND OF THE INVENTION

Portable communication devices, such as mobile phones, develop towards smaller and smaller sizes. Moreover, demands in terms of performance to the mobile phone components are constantly increasing even though the dimensions of the components shrink. Also, the components should be suitable for production in huge numbers in order to satisfy the mobile phone manufacturer. This combination of high performance in a given set-up and high production numbers is generally difficult to meet.

It may be seen as an object of embodiments of the present invention to provide an at least partly custom designed audio/antenna module with the highest possible loudness, said audio/antenna module also being suitable for mass production.

It may be seen as a further object of embodiments of the present invention to reach the highest possible loudness by maximising a membrane area of a transducer of the audio/antenna module.

It may be seen as an even further object of embodiments of the present invention to provide a custom designed audio/antenna module with an improved antenna radiation pattern.

DESCRIPTION OF THE INVENTION

The above-mentioned objects are complied with by providing, in a first aspect, a method for assembling a self-contained audio/antenna module for a portable communication device, the method comprising the step of incorporating, into the audio/antenna module, one or more transducers, said incorporation comprising, for at least one transducer, the steps of

- designing and implementing a membrane structure for the at least one transducer in accordance with design constrains provided by an audio/antenna module casing, and
- incorporating a standard, prefabricated magnetic circuit into the audio/antenna module, said magnetic circuit being adapted to displace the membrane structure of the at least one transducer in accordance with incoming audio drive signals.

The term "transducer" should be understood broadly. Thus, the term transducer may be a loudspeaker or a receiver.

It is an advantage of the audio/antenna module of the present invention that it forms a self-contained module which may be clicked onto a printed circuit board (PCB) of a portable communication device, such as a mobile phone. Suitable mechanical click-on means may be provided on the module to enable this facility.

The incorporation of each of the one or more transducers includes implementation of a custom designed membrane. Preferably, the step of custom designing aims at maximizing the size of the membrane in view of the available space in an audio/antenna module casing in order to maximize the yield of the transducer. Moreover, in order to be able to generate an audible output signal from the transducer a standard, prefabricated drive unit is applied. The drive unit is a none custom designed unit which may be pre-fabricated in large numbers and suitable for use with membranes of different dimensions. Thus, the standard, pre-fabricated drive units may involve off-the-shelf magnetic circuits capable of driving a variety of different membranes and associated voice coils adapted to be attached to such different membranes.

When the membrane has been designed and secured to preferably an upper part of the audio/antenna module casing an off-the-shelf voice coil may be secured to the membrane structure. The voice coil will be at least partly positioned in an air gap of the drive unit. Thus, when an electrical drive signal is provided to the voice coil the membrane will be displaced in accordance therewith.

As already disclosed the designing and implementing of the membrane structure is preferably performed in accordance with an available space in the audio/antenna module casing. In particular, the designing and implementing of the membrane structure is preferably performed with the aim of maximizing the size of the membrane in accordance with the available space in the audio/antenna module casing. Thus, given a layout of the audio/antenna module casing the size of the membrane is maximized in accordance therewith. By maximizing the size of the membrane the highest possible loudness of the transducer is provided.

The shape of the membrane may be chosen to match the shape of the audio/antenna module casing. Thus, the membrane may have for example a circular, an elliptical, a rectangular or a quadratic shape. Other shapes may also be applicable. However, the membrane structure is preferable designed and implemented so as to exhibit at least two distinct mechanical eigenmodes, said at least two distinct mechanical eigenmodes preferably being defined by at least two substantially perpendicular directions defined by the membrane structure.

In a second aspect, the present invention relates to a self-contained audio/antenna module for a portable communication device, the self-contained audio/antenna module comprising one or more transducers, each of said one or more transducers comprising

- a membrane structure implemented in accordance with design constrains provided by an audio/antenna module casing, and
- a standard, prefabricated magnetic circuit being adapted to displace the membrane structure in accordance with incoming audio drive signals.

Again, the term "transducer" should be understood broadly. Thus, the term transducer may be a loudspeaker or a receiver.

The self-contained audio/antenna module may further comprise an antenna module suitable for communication in the 0.7-2.6 GHz range. The antenna module may comprise a flex-print carrying an antenna structure thereon. The antenna structure may be formed by conductive paths arranged on one or two sides of the flex-print.

The membrane structure may comprise a dome-shaped membrane preferably having at least two distinct mechanical eigenmodes. The at least two distinct mechanical eigenmodes may be defined by at least two substantially perpendicular directions defined by the membrane structure, in particular the shape of the membrane structure.

The membrane structure may be made of a laminated polymer foil. It is preferably shaped into its desired form and geometry in a thermoform process. Typically, the membrane structure comprises a centre portion and a surround for suspending the centre portion. The centre portion and the surround may be separated by a relatively narrow region to which the voice coil preferably is attached.

In order to achieve the highest possible audio loudness an interior portion of the audio/antenna module casing preferably forms an acoustic back-chamber for the transducer.

To obtain optimal antenna performance with reduced interference from the magnetic circuit of the drive unit the physical distance between the antenna and the magnetic circuit should be maximized. This may be achieved by letting at least part of the magnetic circuit forms part of an exterior surface portion of the audio/antenna module. In this way, the magnetic circuit is positioned at one exterior surface of the audio/antenna module whereas the antenna module is positioned on or at an oppositely arranged exterior surface of the audio/antenna module.

BRIEF DESCRIPTION OF THE DRAWINGS

The present invention will now be explained in further details with reference to the accompanying figures, where.

Figure 1:
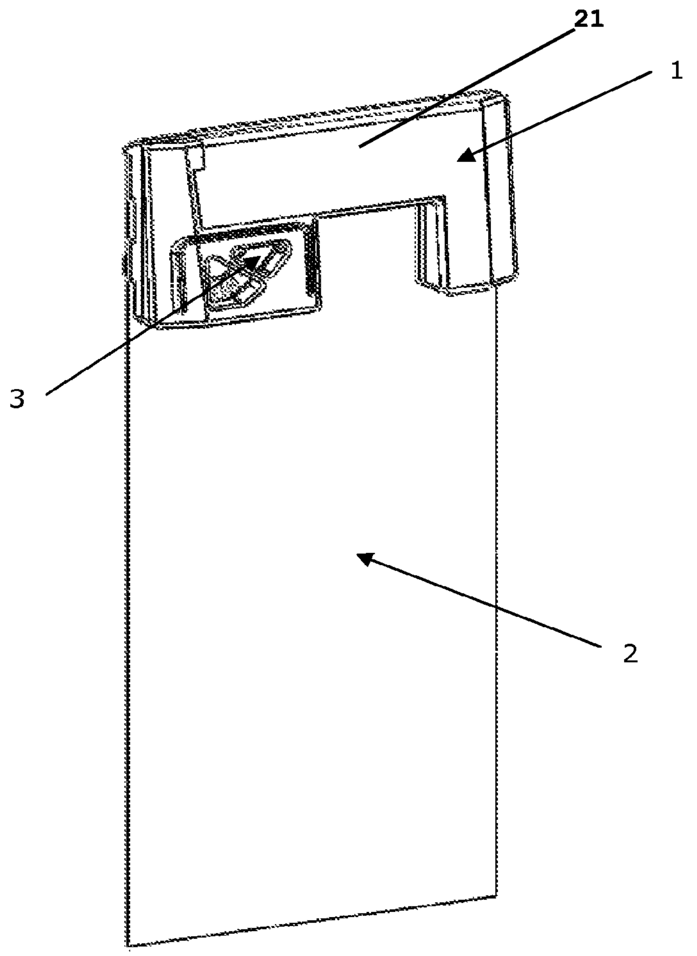
FIG. 1 shows an audio/antenna module attached to a PCB.

While the invention is susceptible to various modifications and alternative forms, specific embodiments have been shown by way of examples in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

Generally, the present invention relates to a method for designing custom designed audio/antenna modules for portable communication devices, such as mobile phones. The method aims at maximizing a membrane area of a transducer incorporated into the audio/antenna module. The transducer can be a loudspeaker or a receiver for a hearing aid. A standard and pre-fabricated motor is provided for driving the maximized membrane. The standard and pre-fabricated motor typically includes a magnetic circuit and a voice coil adapted to be attached to the membrane. The magnetic circuit and the voice coil are, in the present context, to be considered off-the-shelf items. Moreover, the present invention relates to audio/antenna modules fabricated using the before-mentioned method.

Referring now to FIG. 1 an audio/antenna module 1 according to an embodiment of the present is depicted. As depicted in FIG. 1 the audio/antenna module 1 is attached to a printed circuit board (PCB) 2 which is shaped to fit into a housing of for example a mobile phone. The audio/antenna module 1 obviously comprises a sound generating element, such as a loudspeaker, and an antenna (not shown in FIG. 1) suitable for transmitting and receiving signals at radio frequencies typically used for mobile communication devices. Sound outlets 3 are provided in the audio/antenna module.

Figure 2:
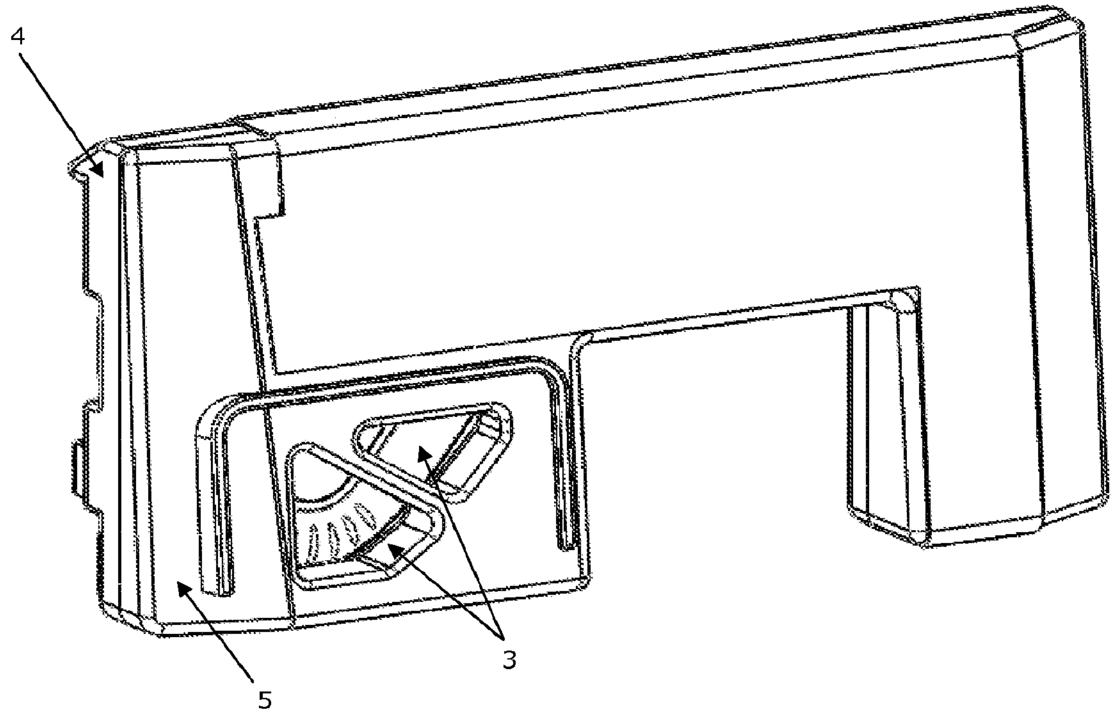
FIG. 2 shows an audio/antenna module.

FIG. 2 shows an audio/antenna module comprising a lower housing part 4 and an upper housing part 5 within which a number (here three) of sound outlets 3 are provided. Obviously the number of sound outlets and the shape of the sound outlets may be different from what is depicted in FIG. 2. The upper and lower housing parts can be fabricated in plastic using traditional injection moulding techniques.

Figure 3:
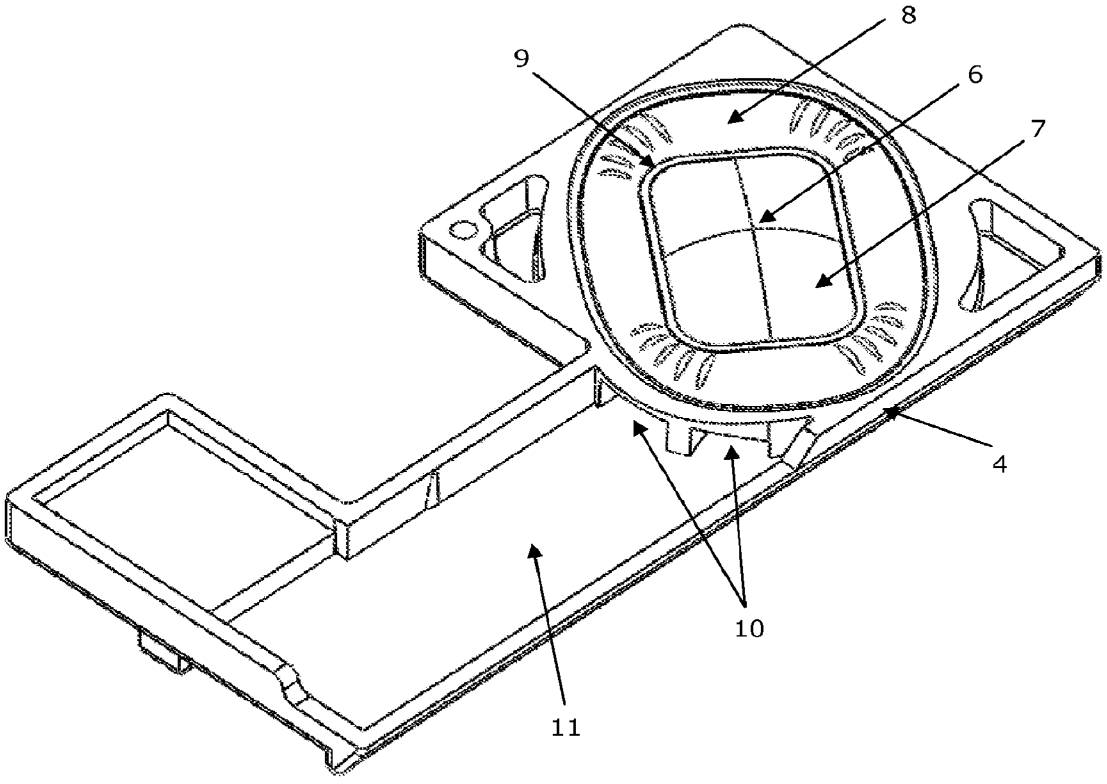
FIG. 3 shows a lower part of an audio/antenna module.

FIG. 3 shows a lower housing part 4 having a loudspeaker membrane 6 attached thereto. The membrane typically consists of a piece of laminated polymer foil which is thermo formed into a predetermined shape and geometry in order to match the shape of a given audio/antenna housing. The polymer foil or foils used for manufacturing the membrane are off-the-shelf product(s). However, the manufacturing process is a customized process.

As depicted in FIG. 3 the membrane has a centre portion 7 surrounded by a surround 8, the surround 8 suspending the centre portion 7. A voice coil (not shown in FIG. 3) is attached to underside of the membrane along the path 9. A number of openings 10 allow pressurized air to escape from the underside of the membrane into an acoustical back chamber 11 which is formed in combination with a portion of the upper housing part (not shown in FIG. 3). It should be noted that it is a design choice whether the front chamber (the volume in front of the membrane) or the back chamber (the volume behind the membrane) is acoustically connected to the sound outlets (not shown in FIG. 3) in the upper housing part.

Figure 4:
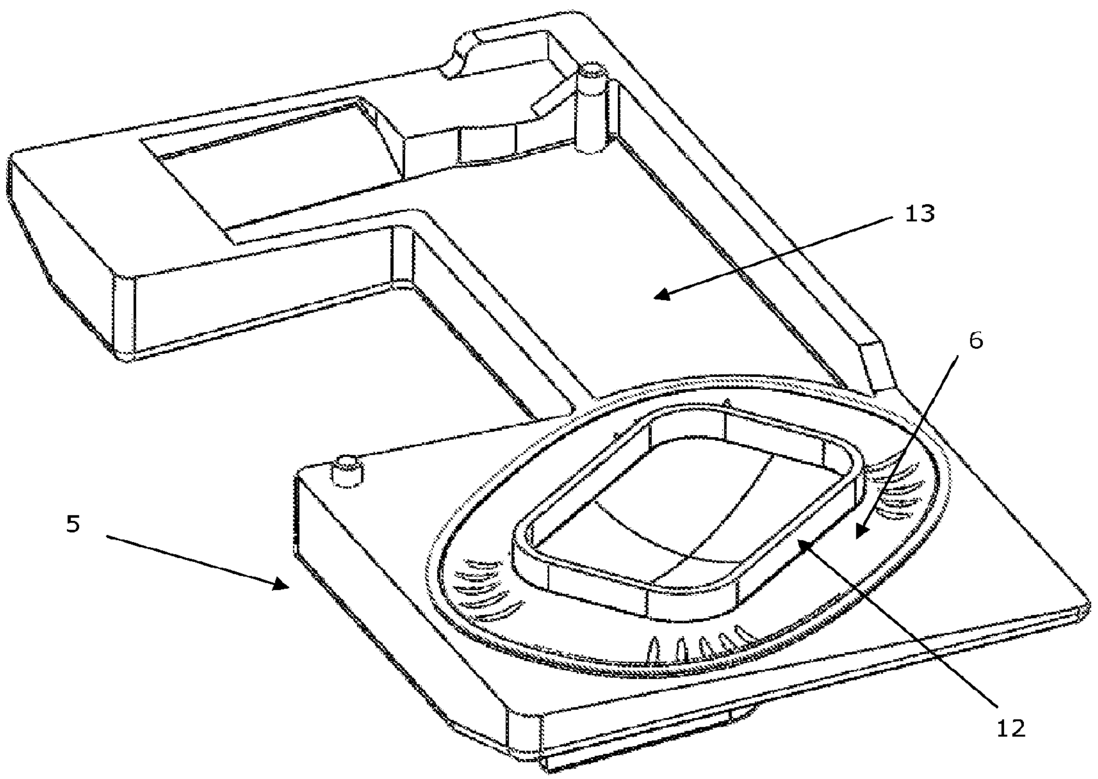
FIG. 4 shows an upper part of an audio/antenna module.
Figure 5:
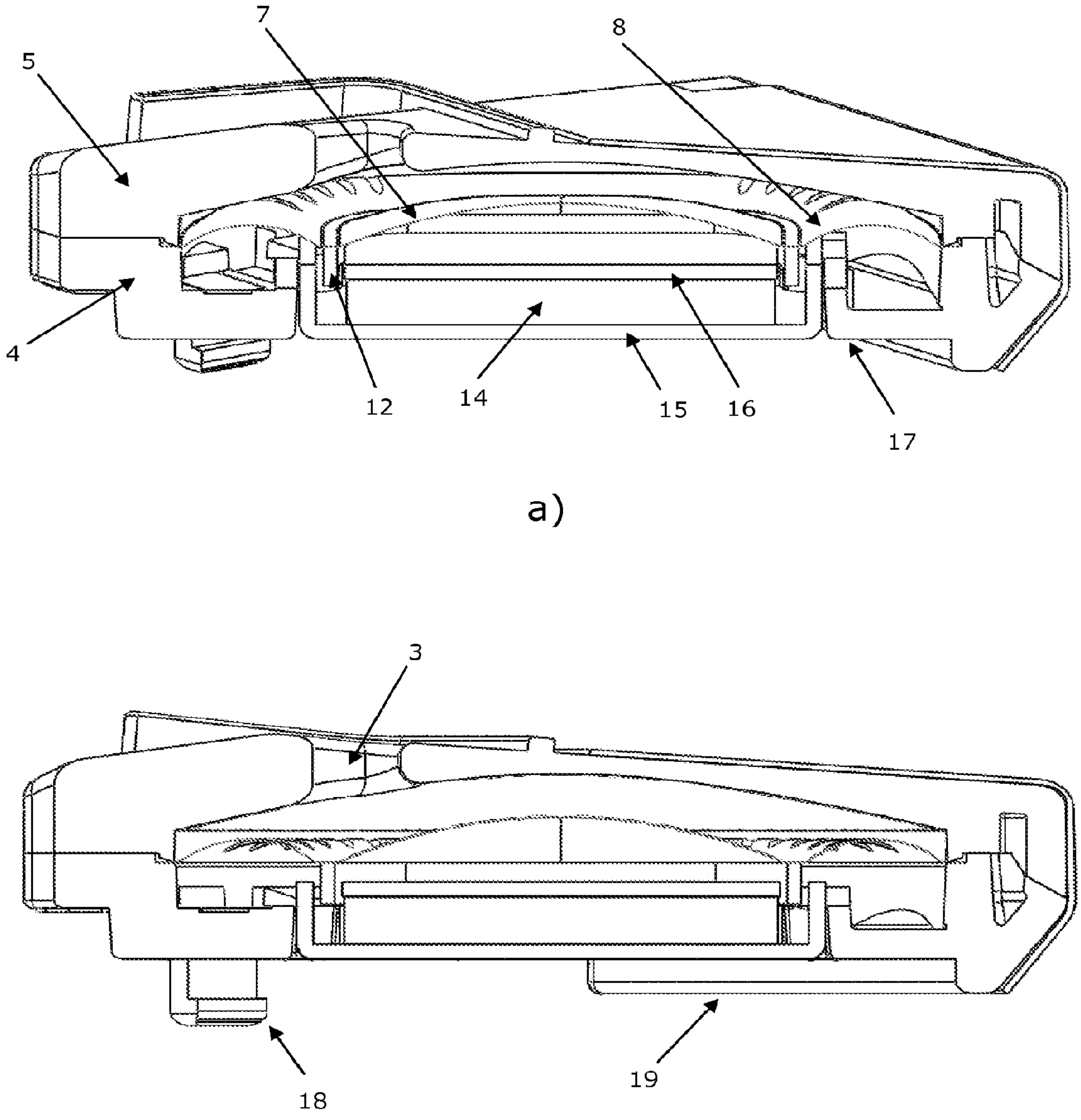
FIG. 5 shows cross-sectional views of an assembled audio/antenna module.

FIG. 4 shows the upper housing part 5 with a membrane 6 attached thereto. As depicted in FIG. 4 a voice coil 12 has been secured to the membrane. The nearly rectangular-shaped voice coil is driven by a standard and prefabricated motor in the form of a magnetic circuit as explained in further details in connection with FIG. 5. Appropriate drive signals applied to the standard and prefabricated motor causes the membrane to be displaced in accordance therewith. As stated above an acoustical back chamber is formed by portions 11, 13 of the upper and lower housing parts in combination.

FIGS. 5*a* and 5*b* show cross-sectional views of an assembled audio/antenna module. The cross-sectional views are provided through a loudspeaker of the module. Referring now to FIG. 5*a* the upper 5 and lower 4 housings parts are assembled to form the module. Moreover, a customized membrane comprising a centre portion 7 and a surround 8 is provided. An appropriately shaped voice coil 12 is attached to the membrane in such a way that it is at least partly positioned in one or more air gaps of a magnet circuit comprising a permanent magnet 14, an outer pole piece 15, and a centre pole piece 16. The before-mentioned air gaps are positioned between the outer pole piece 15 and the centre pole piece 16. As depicted in FIG. 5*a* the outer pole piece 15 secures the magnetic circuit to the lower housing part 4.

It is advantageous to the performance of the audio/antenna module to encapsulate or coat the magnetic circuit in a material that limits interference between the magnetic circuit and the antenna. The inventors of the present invention have realised that by coating the magnetic circuit with a Ni—Cu—Ni layer the before-mentioned interference problems can be significant reduced. The thickness of the Ni—Cu—Ni layer is typical 1-2 μm Ni+8-12 μm Cu+1-2 μm Ni.

In a preferred embodiment, the middle section of the outer pole piece 15 is aligned with the bottom surface 17 of the lower housing part 4. This embodiment is depicted in FIGS. 5*a* and 5*b*. By positioning the magnetic circuit at this position several advantages are obtained—among those being:

1. The audio/antenna module as a whole can be made thinner compared to traditional modules. A thin audio/antenna module can meet the high constrains that typically occurs within the mobile phone industry where available space is a critical issue.
2. The dome of the membrane can be relatively high—thus, the dome does not have to be flat. A higher dome can be made of a thin foil whereby the mass of the dome can be kept low.
3. The antenna module of the audio/antenna module is typically attached to the upper housing part 5 of the audio/antenna module. By positioning the magnetic circuit as illustrated in FIGS. 5*a* and 5*b* the distance between the antenna module and the magnetic circuit is maximized. This results in an optimal antenna performance with reduced interference from the magnetic circuit.

FIG. 5*b* shows the same embodiment as FIG. 5*a*, but from another perspective. In FIG. 5*b* the acoustical sound outlets 3 are visible. Moreover, means 18, 19 for fastening the audio/antenna module to an associated PCB are clearly visible in FIG. 5*b*. The fastening means 18, 19 illustrated in FIG. 5*b* are adapted to be clicked onto the PCB in a very easy way.

Figure 6:
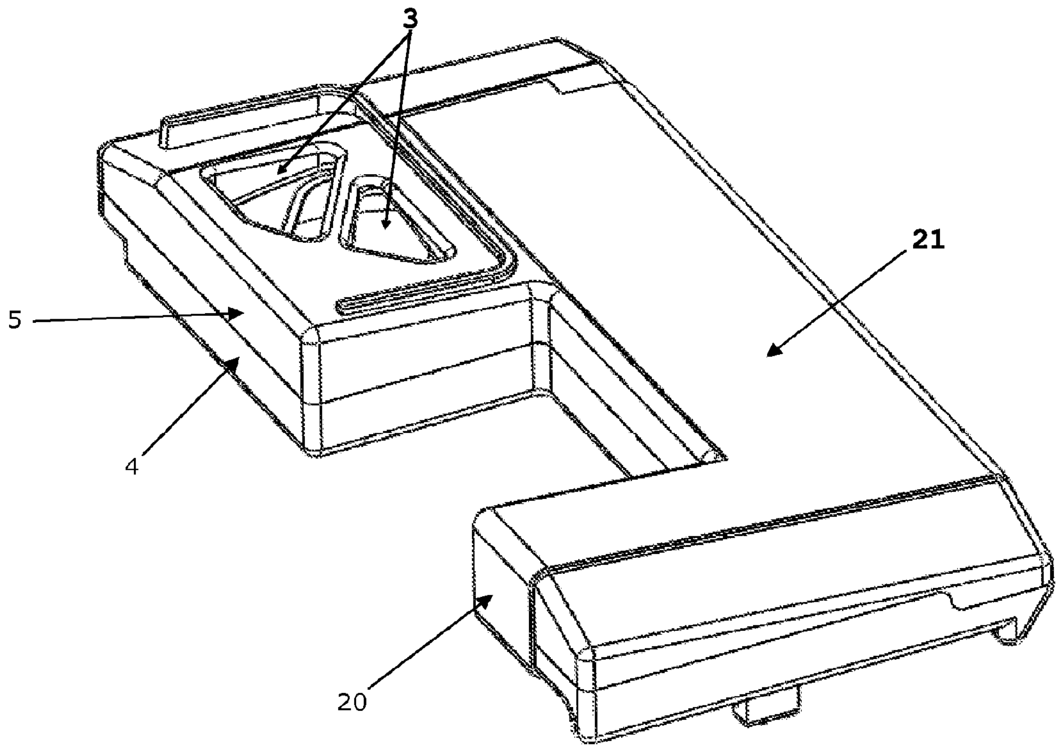
FIG. 6 shows an audio/antenna module with a RF antenna attached to a housing part of the module.

FIG. 6 shows an embodiment of the present invention including a RF antenna provided on a flex-print 21 which is attached to the upper housing part 5. The antenna itself (not shown) is formed by conductive paths provided on either one or both sides of the flex-print. The physical layout of the conductive path or paths may vary in order to match the frequency to be applied, such frequency typically being within the frequency bands of standard networks for mobile phones. As depicted in FIG. 6 the flex-print may have a bended portion 20 in order ease electrical access to electrical contact points provided on an exterior surface of the lower housing part 4. Signals to and/or from the antenna is provided through such contact points.

Figure 7:
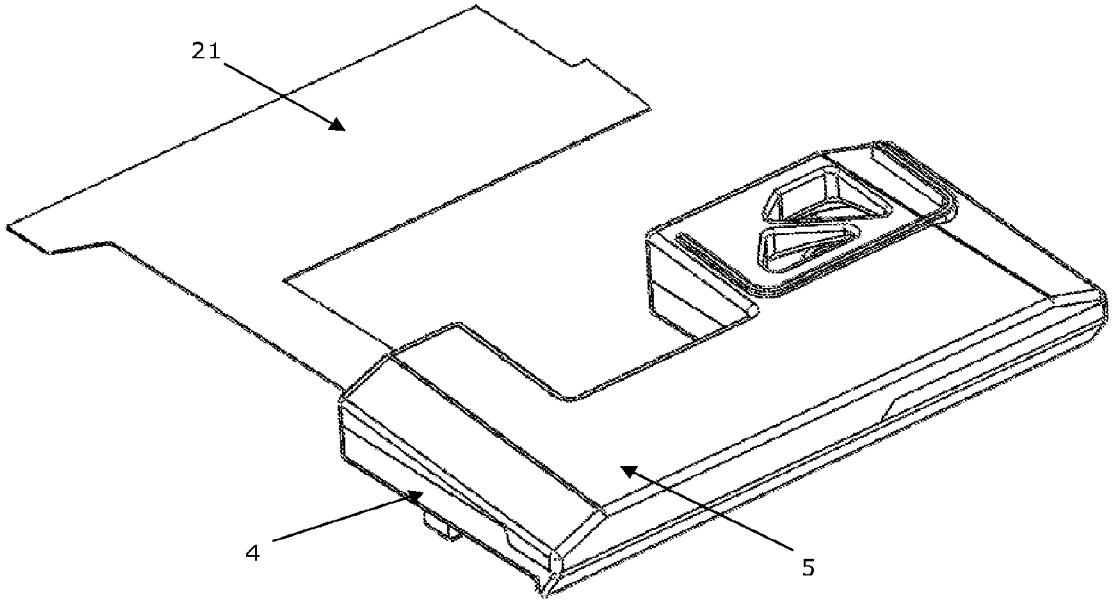
FIG. 7 shows an audio/antenna module with a unfolded RF antenna to a housing part of the module.

The bended portion of the flex-print may be provided by bending or forming the flex-print 21 around the housing parts 4, 5 as illustrated in FIG. 7. Thus, in a first step the flex-print 21 may be attached to the contact points of the lower housing part 4 and then, in a second step, folded around the housing part 4, 5 to end up as illustrated in FIG. 6.

The invention claimed is:

1. An audio/antenna module for a portable communication device, the audio/antenna module comprising one or more transducers and a RF antenna, wherein each of the one or more transducers comprises:

a membrane structure implemented in accordance with design constrains provided by the audio/antenna module so that the size of the membrane is maximized in accordance with the available space in the audio/antenna module, the membrane structure being attached to the audio/antenna module;

a standard, prefabricated magnetic circuit being adapted to displace the membrane structure in accordance with incoming audio drive signals, wherein at least part of the magnetic circuit forms part of an exterior surface portion of the audio/antenna module; and wherein the magnetic circuit is positioned at one exterior surface of the audio/antenna module whereas the RF antenna is positioned on or at an oppositely arranged exterior surface of the audio/antenna module.

2. An audio/antenna module according to claim 1, wherein the RF antenna is suitable for communication in the 0.1-10 GHz range.

3. An audio/antenna module according to claim 2, wherein the RF antenna comprises a flex-print carrying an antenna structure thereon.

4. An audio/antenna module according to claim 1, wherein the membrane structure comprises a dome-shaped membrane.

5. An audio/antenna module according to claim 1, wherein the membrane structure exhibits at least two distinct mechanical eigenmodes.

6. An audio/antenna module according to claim 5, wherein the at least two distinct mechanical eigenmodes are defined by at least two substantially perpendicular directions defined by the membrane structure.

7. An audio/antenna module according to claim 1, wherein an interior portion of the audio/antenna module casing forms an acoustic back-chamber for the transducer.

* * * * *